United States Patent
Reimer et al.

(10) Patent No.: US 10,290,844 B2
(45) Date of Patent: May 14, 2019

(54) RETAINING DEVICE FOR AT LEAST ONE BATTERY CELL

(71) Applicant: Robert Bosch GmbH, Stuttgart (DE)

(72) Inventors: Eduard Reimer, Stuttgart (DE); Carsten Mueller, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 411 days.

(21) Appl. No.: 14/911,891

(22) PCT Filed: Aug. 8, 2014

(86) PCT No.: PCT/EP2014/067133
§ 371 (c)(1),
(2) Date: Feb. 12, 2016

(87) PCT Pub. No.: WO2015/022279
PCT Pub. Date: Feb. 19, 2015

(65) Prior Publication Data
US 2016/0204402 A1 Jul. 14, 2016

(30) Foreign Application Priority Data
Aug. 14, 2013 (DE) .................. 10 2013 216 070

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
None
See application file for complete search history.

(56) References Cited

U.S. PATENT DOCUMENTS

| 2004/0144908 A1 | 7/2004 | Shannon |
| 2005/0031946 A1* | 2/2005 | Kruger ............ H01M 2/0212 429/159 |
| 2011/0104556 A1 | 5/2011 | Kim et al. |

FOREIGN PATENT DOCUMENTS

| CN | 201998780 | 10/2011 |
| CN | 202617530 U | 12/2012 |
| CN | 102934259 A | 2/2013 |
| DE | 2631489 | 2/1977 |
| DE | 102012224041 | 6/2013 |
| EP | 952620 | 10/1999 |
| EP | 1505670 | 2/2005 |
| FR | 2691292 | 11/1993 |
| GB | 2485247 | 5/2012 |
| JP | H04337263 A | 11/1992 |
| JP | H1197095 A | 4/1999 |
| JP | 2011018522 A | 1/2011 |

OTHER PUBLICATIONS

International Search Report for Application No. PCT/EP2014/067133 dated Oct. 27, 2014 (English Translation, 3 pages).

* cited by examiner

*Primary Examiner* — Carmen V Lyles-Irving
(74) *Attorney, Agent, or Firm* — Michael Best & Friedrich LLP

(57) ABSTRACT

The invention relates to a retaining device for at least one battery cell, wherein the retaining device comprises at least two retaining elements, wherein each retaining element comprises at least one fastening means, wherein the at least two retaining elements are mechanically detachably connected by means of the fastening means.

4 Claims, 2 Drawing Sheets

RETAINING DEVICE FOR AT LEAST ONE BATTERY CELL

BACKGROUND OF THE INVENTION

The invention relates to a retaining device for at least one battery cell comprising at least two retaining elements.

Welded retaining devices that hold together the battery cells under a high contact pressure in a battery module are known from the prior art.

SUMMARY OF THE INVENTION

A disadvantage of the known prior art resides in the fact that, in order to produce a battery module, the battery cells must be pushed together by means of a high contact pressure, as a consequence of which it is not possible to position the battery cells precisely, by way of example in order to render it possible to dissipate the heat from the battery cells in a uniform manner, and as a consequence it is not possible as a result of manufacturing tolerances to produce a positive-locking connection between the retaining device and the battery cells.

In contrast, the approach in accordance with the invention has the advantage that a retaining device for at least one battery cell is produced by means of at least two retaining elements, as a consequence of which it is possible to position at least one battery cell precisely and to produce a positive-locking connection between the retaining device and the battery cell.

The retaining device for at least one battery cell comprises at least two retaining elements, wherein each retaining element comprises at least one fastening means and advantageously the at least two retaining elements are connected in a mechanically releasable manner by means of the fastening means.

Advantageously, a fastening means of a first retaining element has a form that corresponds to an inverted form of a fastening means of a second retaining element. The static friction between the forms is advantageously determined by varying the size of the form or of the inverted form, by way of example a connection is produced, wherein there is a small gap between the forms of fastening means and said connection is particularly vibration-resistant. One form advantageously comprises a guide rail and the inverted form comprises a furrow, a groove, and/or a notch. The fastening means comprise advantageously a geometric form, by way of example an S-shaped bend, by means of which a connection is produced that in particular has a high tensile strength and/or is capable of withstanding a pressure and/or is vibration-resistant.

The connection between the retaining elements and the battery cell is advantageously produced in a positive-locking manner, as a consequence of which heat is dissipated from the battery cells in a particularly uniform manner.

The first retaining element and the second retaining element are advantageously connected at a right angle, as a consequence of which a connection is produced that in particular has a high tensile strength and/or is capable of withstanding pressure.

The retaining device advantageously comprises pressure plates that render it possible to align the battery cells, and closure plates that define the size of the battery module and are connected to the pressure plates. If the battery cells are arranged in a row as is the case with conventional battery modules, wherein contact between two battery cells is produced by means in each case of an end face of the battery cells, then the pressure plate is connected to the battery cells along a horizontal extension of the lateral faces of the battery cells. The pressure plates can be fully connected to the battery cells along a vertical extension of the lateral faces of the battery cells. The closure plates are connected to the end faces of a respective first battery cell and a last battery cell of a battery module, said end faces being remote from the other battery cells. A material of the closure plate comprises by way of example a synthetic material having metal tubes pressed therein in order to achieve greater stability of the closure plate.

It is preferred that an additional connection between the pressure plates and the battery cells is provided by means of further fastening means of the pressure plates and in so doing as a result of the retaining device that is produced in this manner a particularly torsion-resistant battery module is produced and the pressure plates are fixed to the battery cells in such a manner that the retaining device is prevented from sliding off.

The retaining device of the at least one battery cell comprises at least two retaining elements having fastening means, wherein the retaining elements are connected one to the other by means of a first connection technique by way of fastening means, wherein the fastening means are advantageously inserted one inside the other and/or plugged one into the other and/or clipped one into the other. This renders it possible to use a simple manufacturing technique in contrast to a conventional welding method and in contrast to the prior art to use lighter materials, by way of example a synthetic material, as a result of which the weight of the battery module is reduced.

In order to produce the retaining device, the at least two retaining elements are advantageously connected one to the other by means of a second connection technique, by way of example by means of screws, by means of a snap connection and/or by means of a press connection, wherein as a result of the additional connection the retaining device and consequently also the battery module advantageously have a greater tensile strength, are capable of withstanding a greater pressure and/or are more torsion-resistant.

The motor vehicle advantageously comprises at least one battery module that includes a retaining device for at least one battery cell, wherein, by way of example as a result of the battery cells being connected in a vibration-resistant manner by means of the retaining device in accordance with the invention, the likelihood of the battery modules failing is reduced, by way of example by virtue of reducing loose connections and reducing damage to the retaining device that can be caused by movements as the vehicle accelerates or vibrates.

Advantageously, materials, by way of example a light metal such as aluminum and/or a synthetic material such as for example polycarbonate, are used for the at least two retaining elements, as a consequence of which the weight of the battery module is reduced and thus by way of example the range of an electric vehicle is extended.

BRIEF DESCRIPTION OF THE DRAWINGS

Exemplary embodiments of the invention are illustrated in the drawing and further explained in the description hereinunder.

In the drawing.

DETAILED DESCRIPTION

Figure 1:
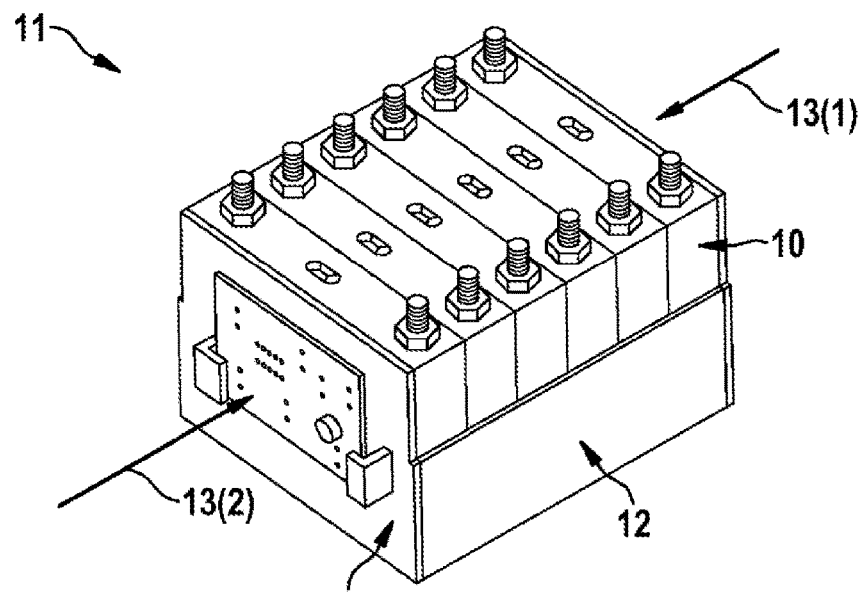
FIG. 1 illustrates a retaining device for at least one battery cell in accordance with the prior art.

Like reference numerals describe like components of the device in all figures.

FIG. 1 illustrates a battery module 11 in accordance with the prior art having by way of example six battery cells 10, wherein in order to produce the battery module 11 the battery cells 10 are pressed together under pressure 13(1), 13(2) and a retaining device 12 is fastened around the battery cells 10 during the procedure of pressing said battery cells one against the other. The retaining device can by way of example comprise a plurality of retaining parts 12, 14 that are welded one to another. In FIG. 1, the retaining parts 12 and 14 are of a different height, by way of example in order to stabilize the battery cells or to fasten a control unit to the battery module 11.

Figure 2:
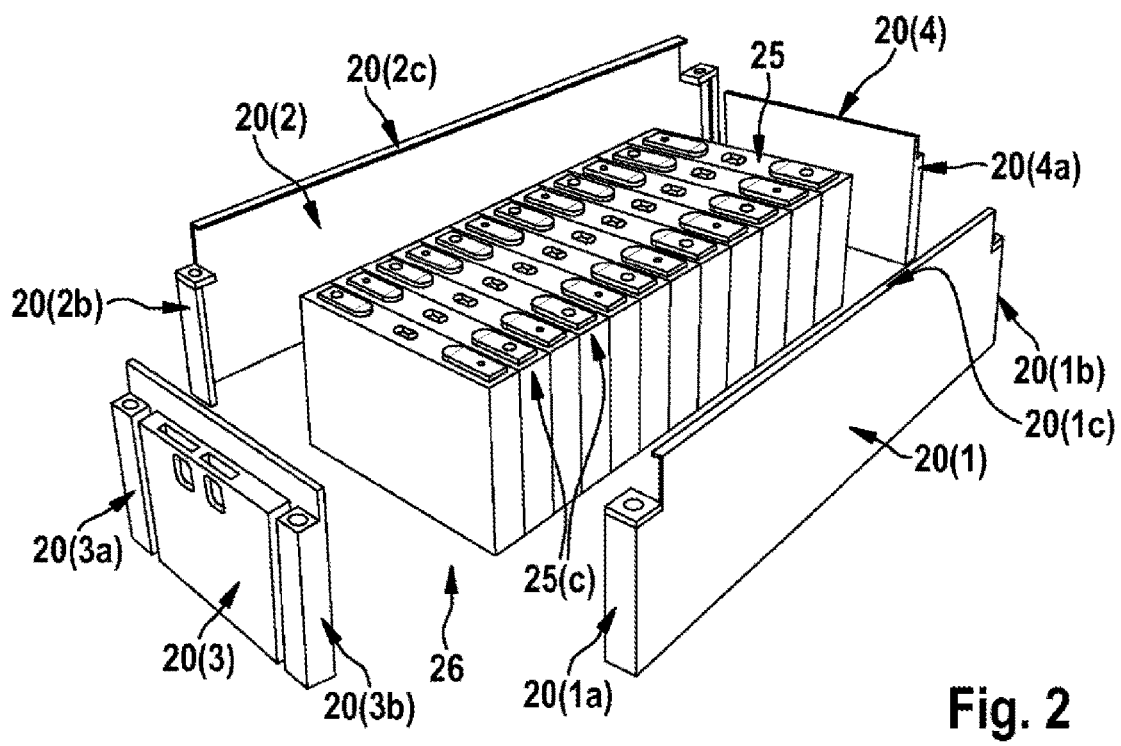
FIG. 2 illustrates an embodiment of the retaining device in accordance with the invention.

FIG. 2 illustrates battery module 26 having twelve battery cells 25 that are connected one to the other in a row in an electrically conductive manner by means of cell connectors. In the illustrated embodiment, a retaining device in accordance with the invention comprises four retaining elements 20(1), 20(2), 20(3), 20(4), wherein the four retaining elements 20(1), 20(2), 20(3), 20(4) comprise two pressure plates 20(1), 20(2) and two closure plates 20(3), 20(4). The pressure plates 20(1), 20(2) or the two closure plates 20(3), 20(4) comprise fastening means 20(1a), 20(1b), 20(2b) or 20(3a), 20(3b), 20(4a). In the illustrated embodiment, the fastening means 20(3a), 20(3b), 20(4a) comprise in each case a groove that has a form that is inverted with respect to a respective guide rail of the fastening means 20(1a), 20(1b), 20(2b). A connection is thus achieved between the pressure plate 20(1), 20(2) and at least one of the closure plates 20(3), 20(4) by way of example by means of pushing together a groove and a guide rail. The pressure plates 20(1), 20(2) comprise a further fastening means 20(1c), 20(2c) that has a form that is inverted with respect to a fastening means 25(c) of the battery cells 25, so that in addition a connection is produced between the pressure plate 20(1), 20(2) and the battery cells 25, by way of example so as to stabilize the pressure plates 20(1), 20(2). The fastening means 25(c) are advantageously a furrow on an upper face of the battery cells 25 that extends essentially parallel to the pressure plates 20(1), 20(2).

Figure 3A:
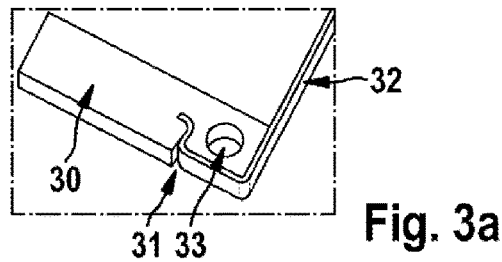
FIG. 3a illustrates an embodiment of a first connection technique.

FIG. 3a illustrates a section 30 of a closure plate 20(3), 20(4), a section 32 of a pressure plate 20(1), 20(2), a cutout 31 of a fastening means 20(1a), 20(1b), 20(2b) and a cutout 33 of a further fastening means. In the illustrated embodiment, the fastening means 20(1a), 20(1b), 20(2b) comprises an S-shaped guide rail, wherein the S-shaped guide rail are connected one to the other to an S-shaped groove of the fastening means 20(3a), 20(3b), 20(4a), wherein the S-shaped groove comprises a form that is inverted with respect to the S-shaped guide rail. The fastening means 20(3a), 20(3b), 20(4a) comprise a further fastening means having a cutout 33 for a second connection technique, by way of example by means of screws, by means of a snap connection and/or by means of a press connection.

Figure 3B:
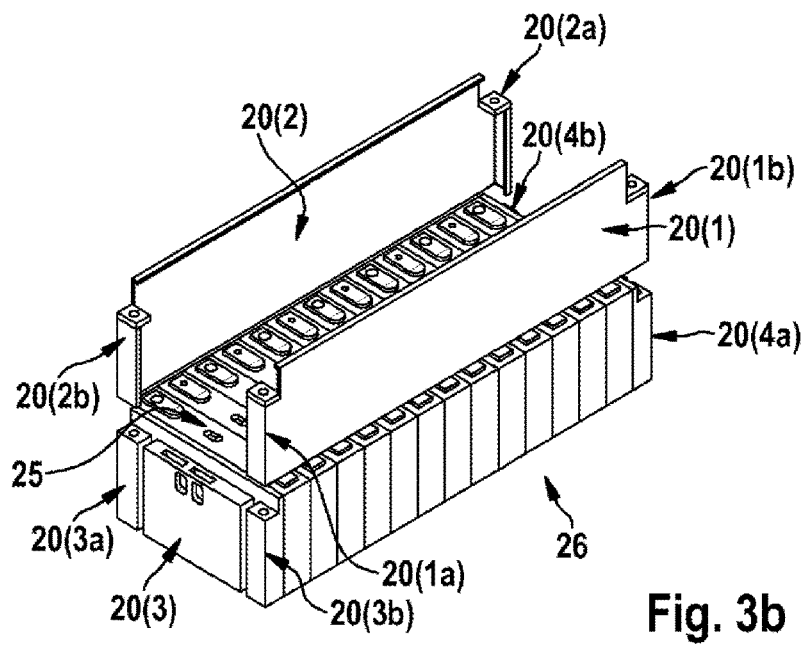
FIGS. 3b, 3c illustrate an embodiment of a method for producing a retaining device.
Figure 3C:
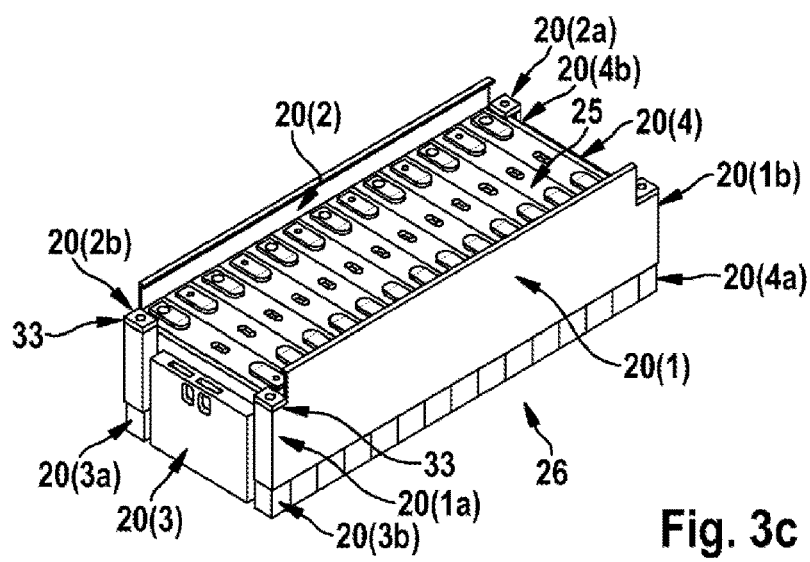

The FIGS. 3b and 3c illustrate a battery module 26 having twelve battery cells 25 prior to (FIG. 3b) or after (FIG. 3c) inserting the fastening means 20(1a), 20(3b) or 20(3a), 20(2b) or 20(4a), 20(1b) or 20(2a), 20(4b) one into the other, which produces a retaining device, wherein the battery cells are held together by virtue of connecting the pressure plates 20(1), 20(2) and the closure plates 20(3), 20(4) so as to form a battery module 26. The pressure plates 20(1), 20(2) can by way of example be screwed to the closure plates 20(3), 20(4) by means of at least one cutout 33, as a consequence of which a stable connection is achieved and/or as a consequence of which the pressure plates 20(1), 20(2) and the closure plates 20(3), 20(4), are prevented from being pushed apart by way of example as a result of vibration movements of the vehicle.

The invention claimed is:

1. A retaining device for at least one battery cell (25), wherein the retaining device comprises at least two retaining elements (20(1), 20(2), 20(3), 20(4)), wherein each retaining element (20(1), 20(2), 20(3), 20(4)) comprises at least one fastening means (20(1a), 20(2a), 20(3a), 20(4a), (20(1b), 20(2b), 20(3b), 20(4b)), characterized in that the at least two retaining elements ((20(1), 20(2), 20(3), 20(4))) are connected in a mechanically releasable manner by the fastening means (20(1a), 20(2a), 20(3a), 20(4a), 20(1b), 20(2b), 20(3b), 20(4b)), wherein first fastening means (20(1a), 20(1b), 20(2a), 20(2b)) have an s-shaped guide rail which corresponds to an inverted form of an s-shaped groove of second fastening means (20(3a), 20(3b), 20(4a), 20(4b)), wherein the retaining elements (20(1), 20(2), 20(3), 20(4)) provide a form-fitting connection with the battery cell (25), wherein the retaining device surrounds end faces and side faces of the at least one battery cell (25), and wherein at least one of the retaining elements (20(1), 20(2)) having the first or second fastening means (20(1a), 20(2a), 20(3a), 20(4a), (20(1b), 20(2b), 20(3b), 20(4b)) further comprises a further fastening means (20(1c), 20(2c)) having a form complementary to an upper face of the at least one battery cell (25) and engaged therewith to retain the at least one battery cell (25).

2. The retaining device according to claim 1, characterized in that a first retaining element (20(1), 20(2), 20(3), 20(4)) and a second retaining element (20(1), 20(2), 20(3), 20(4)) are connected one to the other at a right angle.

3. A battery module (26) comprising at least one battery cell (25) having a retaining device according to claim 1.

4. A motor vehicle having at least one battery module (26) according to claim 3.

* * * * *